United States Patent [19]
Weiss

[11] Patent Number: 5,861,610
[45] Date of Patent: Jan. 19, 1999

[54] HEATER WIRE WITH INTEGRAL SENSOR WIRE AND IMPROVED CONTROLLER FOR SAME

[75] Inventor: John Weiss, Mount Sinai, N.Y.

[73] Assignee: Micro Weiss Electronics, West Babylon, N.Y.

[21] Appl. No.: 821,527

[22] Filed: Mar. 21, 1997

[51] Int. Cl.$^6$ ...................................................... H05B 1/02
[52] U.S. Cl. .......................... 219/497; 219/499; 219/212; 219/505; 219/481
[58] Field of Search ..................................... 219/212, 481, 219/488, 501, 505, 506, 497; 307/117, 119

[56] References Cited

U.S. PATENT DOCUMENTS

| | | | |
|---|---|---|---|
| 4,549,074 | 10/1985 | Matsuo | 219/506 |
| 5,015,827 | 5/1991 | Kadwell et al. | 219/497 |
| 5,332,886 | 7/1994 | Schilling et al. | 219/506 |

*Primary Examiner*—Mark H. Paschall
*Attorney, Agent, or Firm*—Hoffman & Baron, LLP

[57] ABSTRACT

An improved heater wire and electro-thermal controller suitable for use in electric heating appliances such as electric blankets and heating pads. The heater wire is formed with a first conductor for heat generation and a second conductor for sensing. The first conductor and second conductor are wound as coaxial spirals with an insulation material electrically isolating the two conductors. The two spirals are counter-wound with respect to one another to insure that the turns cross, albeit on separate planes, several times per inch. With the conductors thus formed, if the insulation separating the conductors fails, the first and second conductors will come into electrical contact to facilitate detection of this hazardous condition. The controller of the present invention includes an electronic control unit a sensor input circuit, a heater driver circuit and a user interface circuit. The heater driver circuit is operatively coupled to the first conductor and provides a heater voltage in response to a signal received from the electronic control unit. The sensor input circuit is operatively coupled to the second conductor, measures a resistance and voltage associated therewith, and provides a signal to the electronic control unit in response thereto. The electronic control unit is responsive to signals received from both the user interface circuit and sensor wire input circuit and controls the heater driver circuit accordingly.

17 Claims, 7 Drawing Sheets

HEATER WIRE WITH INTEGRAL SENSOR WIRE AND IMPROVED CONTROLLER FOR SAME

BACKGROUND OF THE INVENTION

1. Field of the Invention

The present invention relates generally to heater wire and more particularly relates to heater wire having an integral sensor wire and an improved controller therefor.

2. Description of the Prior Art

Specialized wire for performing electro-thermal conversion, commonly referred to as heater wire, is well known in the prior art. Heater wire is used in a variety of applications including measurement systems, industrial heating processes, and in textile articles, such as electric blankets.

When used in personal textile articles, such as electric blankets, it is critical that the heater wire is used in conjunction with over-heat protection to reduce the risk of fire. Several attempts have been made in the art of electric blanket design to incorporate such protection. These designs attempt to balance user comfort and user safety. To achieve maximum comfort to the user, the heater wire should be permitted to operate as close to the maximum temperature of the article as permitted. To achieve maximum safety, the heater wire must not exceed the maximum temperature or an enhanced risk of fire results.

Figure 1:
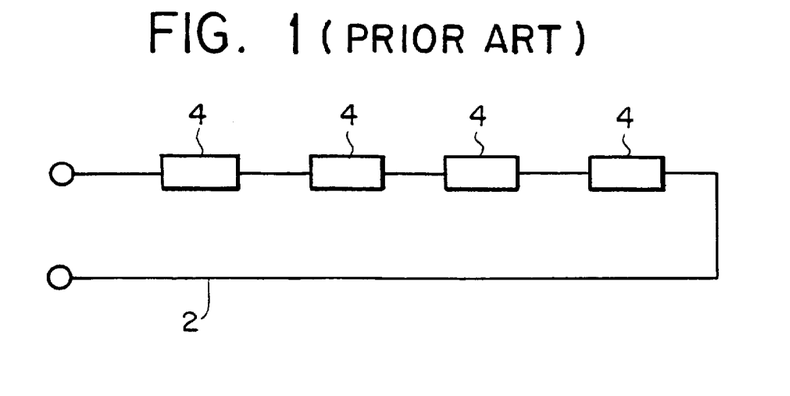
FIG. 1 is a simplified schematic diagram of a heater wire including a plurality of thermostats, as is known in the prior art.

FIG. 1 illustrates a simplified schematic diagram of a heater wire 2 formed with a plurality of thermostats 4 interposed therein. The heater wire 2 is formed from a resistive material and generates thermal energy when a current is passed through it. The thermostats 4 are temperature sensitive switches, such as bimetallic switches, which are normally closed and open only in response to the detection of a predetermined temperature limit. This configuration, which is well known in the art, provides discrete points of over temperature sensing and protection. However, the protection offered by this configuration is limited in that only a certain number of points of protection are distributed throughout the length of the heater wire 2. Further, each thermostat 4 requires two electrical interconnections to the heater wire 2. These connections tend to increase manufacturing costs and decrease product reliability. In addition, the thermostats have a relatively high thermal mass which results in a slow response to rapid temperature changes. As a result, the temperature of the heater wire tends to overshoot the desired temperature.

To overcome the problems associated with the heater wire embodiment illustrated in FIG. 1, heater wires have also been formed which are thermally self limiting. An example of such a self limiting heater wire is disclosed in U.S. Pat. No. 4,309,597 to Crowley. Such a device is illustrated in the simplified schematic diagram in FIG. 2. The heating wire of FIG. 2 includes a pair of conductors 6, 8 and a positive temperature coefficient (PTC) resistive material 10 disposed therebetween. The PTC material 10 forms a distributed resistance between the conductors 6, 8.

Figure 2:
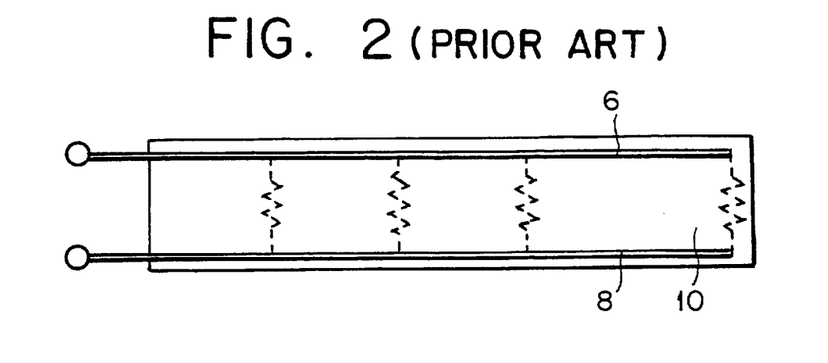
FIG. 2 is a schematic diagram of a heater wire including a pair of conductors separated by a thermal resistive layer, as is known in the prior art.

When a constant voltage is applied across the two conductors 6, 8 a current flows through the PTC material 10 and heat is generated. As the PTC material 10 is heated, the resistance of the PTC material 10 increases and the current is reduced accordingly. In this way, the heater wire effectively self regulates to provide over temperature protection. This embodiment of a heater wire eliminates the manufacturing problems associated with the connection of multiple thermostats within a resistive heating wire. However, the PTC material 10 is typically a high carbon content material and is extremely flammable in the presence of electrical arcing. Therefore, should cracks arise in the PTC material 10 across which electrical arcing occurs, a high risk of fire is presented.

U.S. Pat. No. 4,503,322 to Kishimoto et al. discloses a further embodiment of a self regulating heater wire. The heater wire formed in accordance with the '322 patent is shown schematically in FIG. 3. This heater wire includes three conductors 6, 8, 12 and two thermal-resistive layers 10, 14. Two of the conductors 6, 8 and one thermal-resistive layer 10 function as a heater wire essentially as described in connection with FIG. 2.

Figure 3:
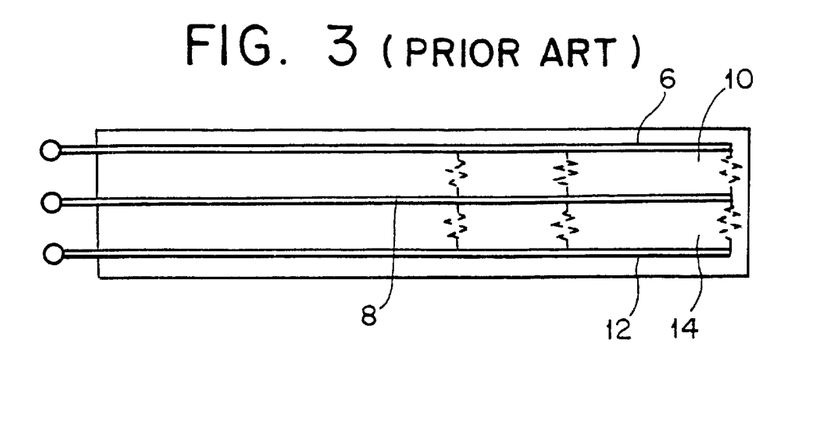
FIG. 3 is a schematic diagram of an embodiment of a heater wire with an integral sensor wire, as is known in the prior art.

The second thermal-resistive layer 14 is interposed between one of the heater wire conductors 6, 8 and the third conductor 12, which is used as a sensor wire. As heat is generated in the first layer 10, the resistance of the second thermal-resistive layer 14 changes in response. This change in resistance between the conductors 8, 12 is indicative of the temperature of the heater wire and can be used to regulate the heat generated by the heater wire. While this configuration of a heater wire provides a sensor wire which enhances the controllability of the heater wire, the fundamental problem of the high flammability due to the high carbon content of the thermal-resistive layers is still present.

OBJECTS AND SUMMARY OF THE INVENTION

It is an object of the present invention to provide a heater wire with an integral sensor wire which is substantially nonflammable.

It is another object of the present invention to provide a heater wire with an integral sensor wire, the sensor wire detecting the temperature of the heater wire and detecting faults in an electrical insulation about the heater wire.

It is yet another object of the present invention to provide a heater wire with an integral sensor wire which is suitable for use with an improved temperature controller.

It is a further object of the present invention to provide a controller for use with a heater wire having an integral sensor wire.

It is still a further object of the present invention to provide an improved controller and heater wire combination which is suitable for use in electric blankets and the like.

It is yet a further object of the present invention to provide an improved controller and heater wire combination which provides enhanced thermal control and reduced risk of fire.

In accordance with one form of the present invention, a heater wire is formed which includes a first conductor and a second conductor electrically isolated from one another by an insulative layer. The first conductor is resistive in nature and generates heat in response to a current passed through it. To enhance the heat generation per unit length, the first conductor is formed as a spiral with a first diameter and a first spiral direction.

The second conductor is thermal-resistive and exhibits a substantially linear change in resistance with respect to temperature. The second conductor is formed as a spiral with a second diameter larger than the first diameter. The second conductor spiral is placed about the first conductor spiral with an electrically insulative layer therebetween, thus forming a coaxial structure. The insulative layer is selected to be substantially electrically insulative, yet thermally conductive, such that the first and second conductors are in thermal communication. The spiral of the second conductor is preferably formed with a spiral direction which is opposite to that of the first conductor.

In accordance with another form of the present invention, a heater wire having a first conductor for heat generation and a second conductor for sensing (sensor wire) is used in combination with an improved electro-thermal controller. The electro-thermal controller preferably includes an electronic control unit (ECU), a user interface circuit, a heater wire driver circuit and a sensor wire input circuit. The heater wire driver circuit is electrically coupled to the first conductor and produces a heater voltage in response to signals received from the ECU. The sensor wire input circuit is operatively coupled to the sensor wire. The sensor wire input circuit measures the resistance of the sensor wire and also detects whether a voltage is present on the sensor wire. The sensor wire input circuit provides electronic signals to the ECU which are indicative of the resistance and voltage. The user interface circuit is electrically coupled to the ECU and provides user input signals to the ECU and preferably provides a display of output signals from the ECU.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 4:
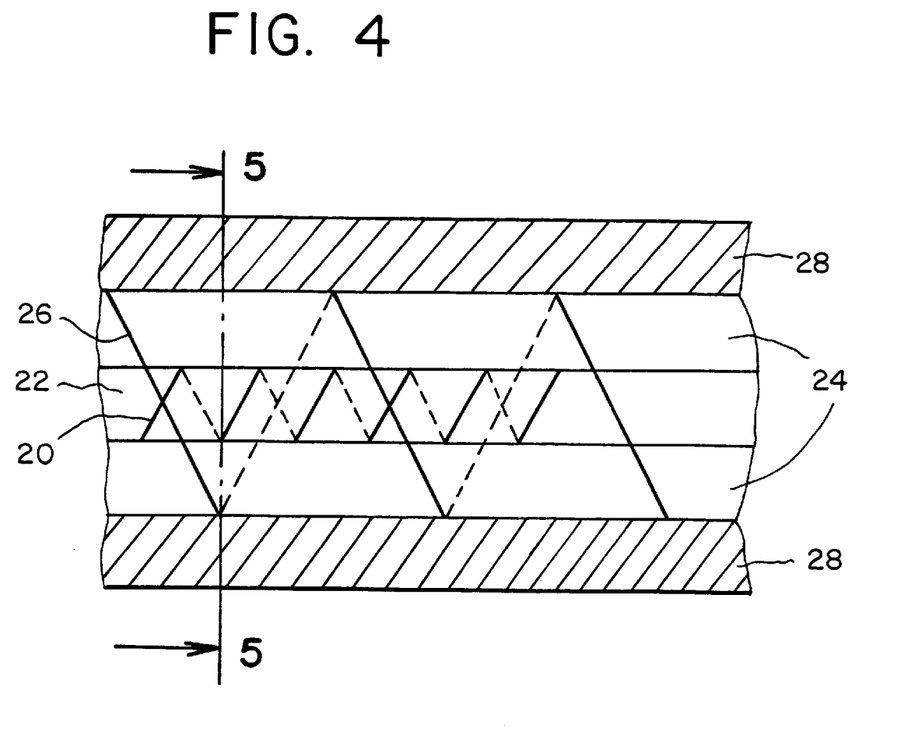
FIG. 4 is a cross-sectional view taken along the length of a heater wire having an integral sensor wire, formed in accordance with the present invention.
Figure 5:
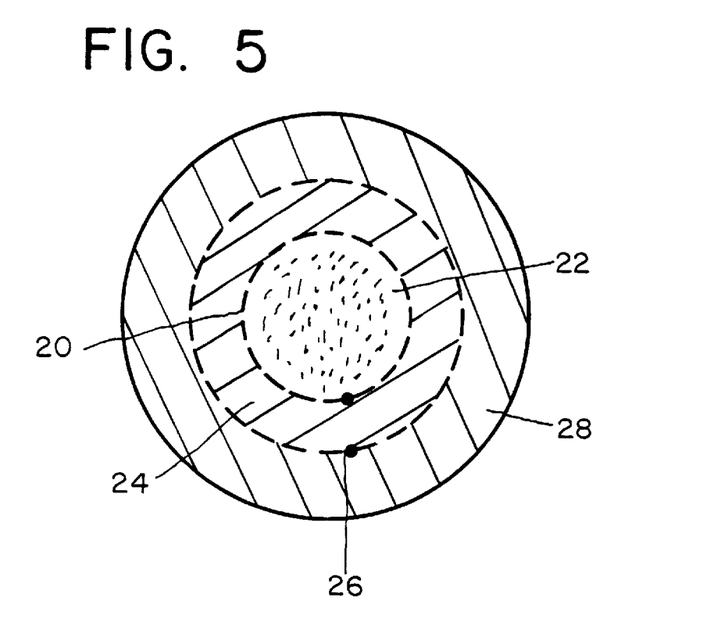
FIG. 5 is a cross-sectional, end view, taken along line 5—5 in FIG. 4 of a heater wire having an integral sensor wire, formed in accordance with the present invention.

FIGS. 4 and 5 illustrate the construction of a heater wire having an integral sensor wire which is formed in accordance with the present invention. The construction characteristics of the heater wire will be described in connection with FIG. 4, which is a cross sectional view taken along the length of the heater wire. The heater wire of the present invention includes a first conductor 20 having a length, a first and second end defining the length and an electrical resistance per unit length. The first conductor 20 is selected to have an intentionally high resistance per unit length such that when a current is passed through the first conductor, power is dissipated and heat is generated.

To increase the heat generating capacity of the heater wire, on a per unit length basis, and to improve the flexability, the first conductor 20 is wound in a spiral fashion about a flexible fibrous core 22. The fibrous core 22 is selected to be heat resistant and electrically non-conductive. The total resistance of the first conductor is a function of the resistance per unit length of the material selected, the diameter of the core 22, and the number of turns per unit length chosen in winding the first conductor 20.

The fibrous core 22 and first conductor 20 are enveloped by a first insulating material 24. Preferably, the first insulating material 24 is a flexible elastomeric material, such as polyethylene, which is both substantially electrically insulative and substantially thermally conductive. The thickness of the first insulative material 24 is not critical, however, a thickness of 0.021 inches has been successfully used to implement the present invention.

A heater wire formed in accordance with the present invention further includes a second conductor 26 which functions as a sensor wire. The second conductor 26 has a first end, a second end and a length defined therebetween. The second conductor 26 is formed from a metallic alloy which has a substantial temperature coefficient of resistance (TCR). High TCR materials exhibit significant changes in resistance when exposed to changes in temperature. Suitable high TCR materials include platinum wire and high percentage nickel alloy wires. As both platinum and pure nickel wire are cost prohibitive, a preferred material for the second conductor 26 is a nickel wire which is 99.5% nickel. This composition exhibits a TCR of approximately 0.005% R/CO°, ±10%.

The second conductor 26 is spirally wound about the first insulative material 24 and first conductor 20. Preferably, the second conductor 26 is wound in a direction which is opposite to that of the first conductor 20. In this way, a coaxial structure is formed having two counter-wound spirals. This is best seen in the end-view cross-section shown in FIG. 5.

A heater wire formed in accordance with the present invention further includes a second insulative material 28. The second insulative material 28 encapsulates the coaxial structure including the first conductor 20, the second conductor 26 and the first insulative material 24. The second insulative material 28 is a substantially electrically non-conductive flexible elastomeric material. The second insulative material 28 is also substantially thermally conductive such that heat generated by the first conductor can pass through it. Preferably, the second insulative material 28 will be of a different composition from the first insulative material 24. This difference facilitates the stripping of the second insulative material 28 from the first insulative material 24 during manufacturing. As an alternative, when the first and second insulative materials 24, 28 are the same material, a mica powder may be applied between the first insulative layer 24 and second insulative layer 28 to facilitate stripping. A preferred material for the second insulative material 28 is polyvinyl chloride (PVC).

Figure 6:
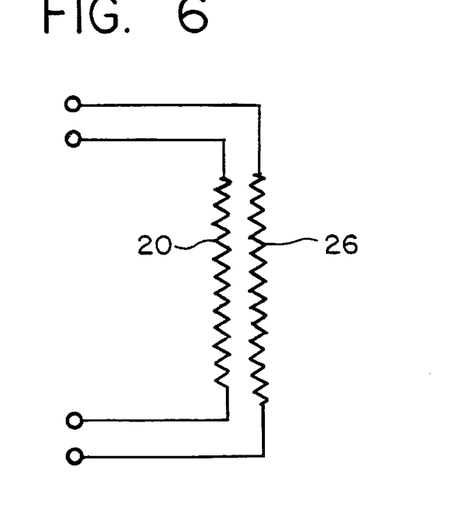
FIG. 6 is an electrical schematic diagram of a heater wire having an integral sensor wire, formed in accordance with the present invention.

The heater wire illustrated in FIGS. 4 and 5 is further illustrated in an electrical schematic diagram in FIG. 6. The first conductor 20 is electrically represented as a first resistor which will generate heat in response to voltage applied thereto. The second conductor 26 is also illustrated as a resistor. The resistor 26 exhibits a varying resistance characteristic in response to a varying temperature.

In addition to sensing changes in temperature by exhibiting a varying resistance, the second conductor 26 can also be used to detect deterioration in the first insulative layer 24. As a result of the preferred counter-wound spiral nature of the first conductor 20 with respect to the second conductor 26, the turns of the respective conductors frequently cross, albeit on a separate coaxial plane, as can be seen in the cross-section of FIG. 4. The crossings occur more frequently, on a per unit length basis, with counterwound conductors 20, 26, than if the conductors 20, 26 were wound in the same direction. In the event that the first insulative material 24 deteriorates, the first conductor 20 will deviate from the coaxial relationship with the second conductor 26. The first conductor 20 will then come into electrical contact with the second conductor 26 at one of these numerous crossing points. As a result of this electrical contact, a voltage which is presented on the first conductor 20 to generate heat will now be coupled to the second conductor 26. Under normal operation as a sensor, the second conductor 26 does not normally carry a voltage. Therefore, the presence of a voltage is an abnormal condition which can easily be detected.

Figure 7:
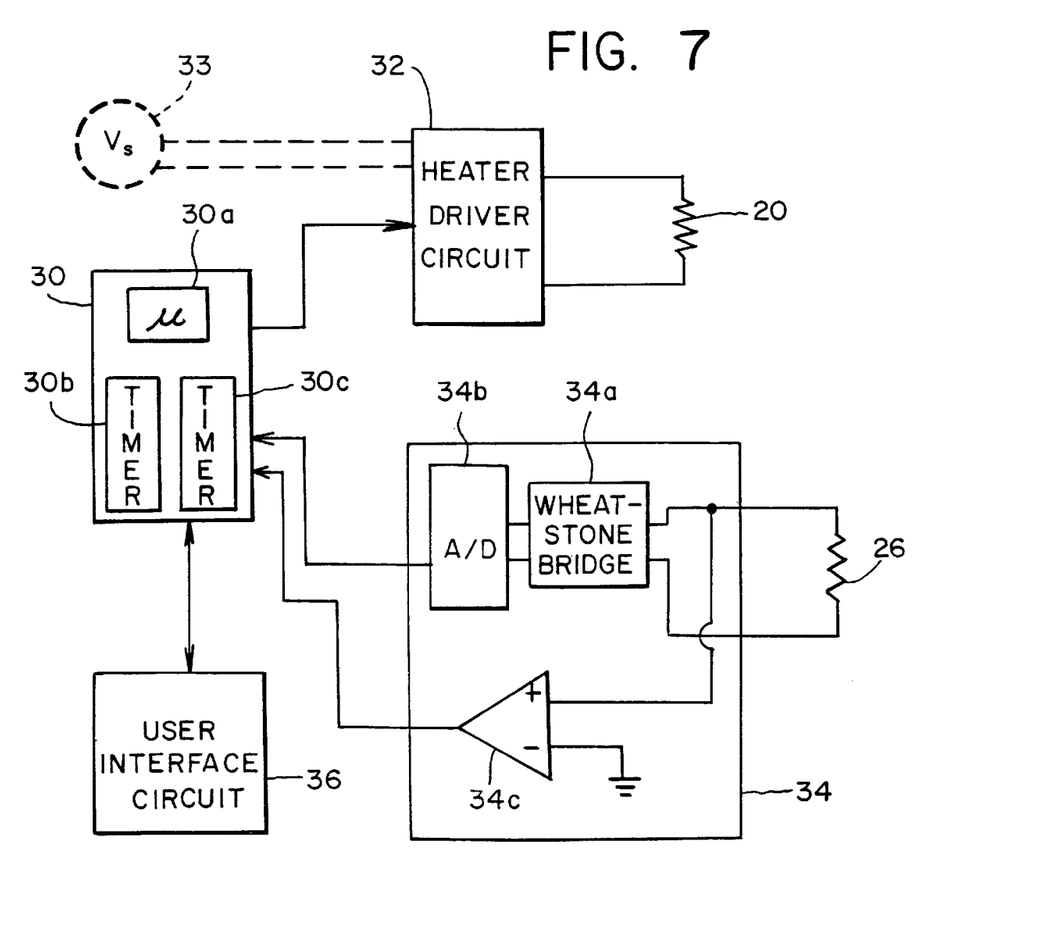
FIG. 7 is a simplified block diagram of an improved electro-thermal controller suitable for use with a heater wire having an integral sensor wire, formed in accordance with the present invention.

To achieve the maximum benefit from a heater wire formed in accordance with the present invention, the heater wire is preferably used in combination with an improved electro-thermal controller. FIG. 7 is a simplified block diagram of an improved electro-thermal controller formed in accordance with the present invention. The electro-thermal controller includes an electronic control unit (ECU) 30, a heater wire driver circuit 32, a sensor wire input circuit 34 and a user interface circuit 36.

The heater driver circuit 32 is electrically coupled to the first conductor 20 of the heater wire formed in accordance with the present invention. The heater driver circuit is also electrically coupled to an external voltage source 33, such as residential house voltage. The heater driver circuit 32 is responsive to signals received from the ECU 30 and selectively applies the external voltage to the first conductor 20. The switched voltage from the heater driver circuit 32 is referred to as the heater voltage. Preferably, the heater voltage is selected such that the first conductor 20 is operating at a maximum allowable power rating. The ECU 30 provides a signal to the heater driver circuit to remove voltage when a desired heater wire temperature has been reached. Preferably, the heater driver circuit 32 employs a triac as a semiconductor switch to control the heater voltage.

The sensor wire input circuit 34 is electrically coupled to the second conductor 26 of the heater wire. The sensor wire input circuit 34 employs conventional circuit means to measure the resistance of the second conductor 26, such as a wheatstone bridge 34a combined with an analog to digital convertor 34b. The sensor wire input circuit 34 also includes conventional means to detect the presence of a voltage signal across the second conductor 26, such as a comparator 34c. A voltage detected across the second conductor 26 is indicative of a deterioration in the first insulative layer 24 of the heater wire. The sensor wire input circuit 34 generates signals which are presented to the ECU 30. The signals are indicative of the measured resistance and detected voltage on the second conductor 26.

The ECU 30 receives the signals from the sensor wire input circuit 34 and provides signals to the heater driver circuit 32 and user interface 36 in response thereto. This provides a closed loop control system in which the temperature of the first conductor 20 may be regulated by the ECU 30 and heater driver circuit 32 in response to a feedback signal provided by the second conductor 26 and sensor wire input circuit 34.

Figure 8:
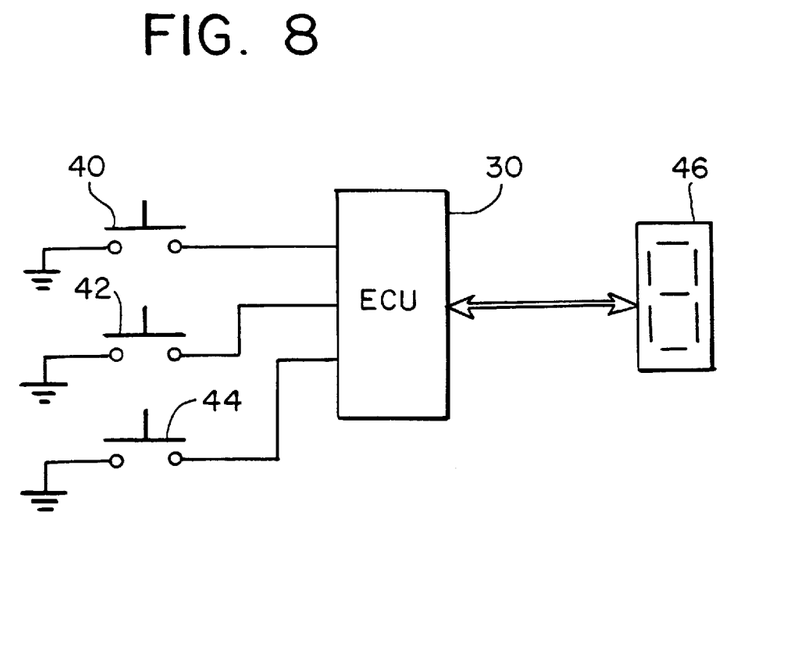
FIG. 8 is a simplified electrical schematic diagram illustrating one embodiment of a user interface circuit and electronic control unit for an improved electro-thermal controller formed in accordance with the present invention.
Figure 9:
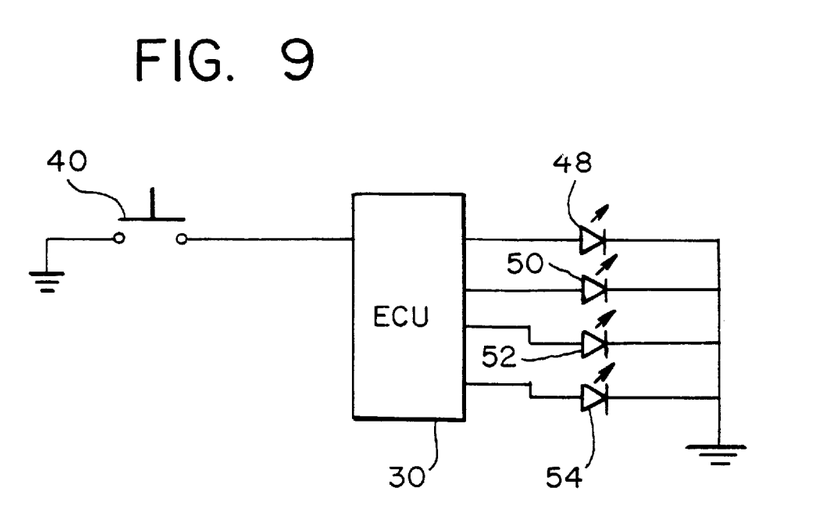
FIG. 9 is a simplified electrical schematic diagram illustrating an alternate embodiment of a user interface circuit and electronic control unit for use with an improved electro-thermal controller formed in accordance with the present invention.

The electro-thermal controller of the present invention further includes a user interface circuit 36. The user interface circuit 36 provides means by which a user may set the desired temperature of the system and preferably includes display means for indicating system parameters to the user. FIGS. 8 and 9 schematically illustrate two embodiments of user interface circuits coupled to the ECU 30.

Referring to FIG. 8, the user interface circuit 36 includes three momentary switches 40, 42, 44 and a seven segment liquid crystal display (LCD) 46. The switches 40, 42, 44 and LCD 46 are electrically coupled to the ECU 30. The ECU 30 senses when the switches 40, 42, 44 are depressed and controls the heater driver circuit 32 and LCD 46 in response thereto.

For example, the first switch 40, may be indicative that the user wishes to apply power to an electric blanket or other such temperature controlled appliance. In response to the closure of switch 40, the ECU 30 will activate the heater driver circuit 32 to apply heater voltage to the first conductor 20. The ECU 30 will preferably also apply a signal to the LCD 46 to indicate that the first conductor 20 is operational. Switches 42 and 44 preferably are activated by the user to increase or decrease the operating temperature of the heater appliance. For example, upon detection of switch 42 being depressed, the ECU 30 can signal the heater driver circuit 32 to maintain heater voltage to the first conductor 20 for a longer time period, thus increasing the operating temperature of the heater appliance. The ECU 30 can also change the display on LCD 46 to indicate this change in operating parameter. In a similar fashion, switch 44 can be used to reduce the operating temperature of the heater appliance.

Referring to FIG. 9, a simplified user interface circuit is illustrated in schematic form. In the embodiment of FIG. 9, a single switch 40 is operatively coupled to the ECU 30. The ECU 30 senses an activation of switch 40 and sequentially selects one of a fixed number of operating temperatures based on the number of activations of switch 40. For example, a first closure of switch 40 may be indicative to the ECU 30 that the user wishes to apply power to the heater appliance. Assuming the heater appliance has four temperature settings, sequentially activating switch 40 will alternately select one of the four temperature settings. A typical sequence of temperature settings is: LOW; MEDIUM; MED-HIGH; HIGH; OFF. The embodiment of FIG. 9 also includes four light emitting diodes 48, 50, 52 and 54. In response to the detection of activation on switch 40, the ECU will preferably illuminate at least one of the four LEDs 48, 50, 52, 54 to display the currently selected operating temperature of the heater appliance.

The heater wire with integral sensor wire and improved controller of the present invention are particularly well suited for heating appliances such as electric blankets, electric throws and electric heating pads. The detailed operation of the present invention will now be described in exemplary fashion in connection with these applications.

For example, an electric blanket may be formed by interposing 100 feet of heater wire, formed in accordance with the present invention, within a fabric shell. Preferably, the heater wire is interposed in a serpentine fashion to provide a substantially uniform distribution of the wire throughout the blanket. Preferably, the wire is further arranged such that the two ends of the wire are in close proximity to one another to facilitate interconnection to the improved controller.

Referring to FIGS. 4 and 5, the first conductor 20 within the heater wire is selected to deliver 159 watts of total power throughout the blanket, or 1.59 watts per foot. To achieve this power output with an average input voltage of 120 VAC RMS (nominal United States line voltage), the resistance per foot of the heater wire must be approximately 0.9 ohms/foot (Ω/ft). This resistance is a function of the diameter, the composition and the total length of the first conductor 20. A preferred construction of the first conductor is achieved using 33 AWG wire formed from a copper alloy material with approximately 12 turns per inch around a 0.021 inch diameter fibrous core 22.

As previously discussed, the second conductor 26 of the heater wire of the present invention functions as a sensor wire. The sensor wire 26 is selected to exhibit a high temperature coefficient of resistance (TCR) so that relatively small changes in temperature may be readily detected. For example, the second conductor is preferably formed from 37 AWG wire with a composition of 99.5% nickel content. When spiraled at approximately 12 turns per inch about a nominal 0.10 inch diameter presented by the first insulative layer, the sensor wire exhibits a nominal resistance of 10 Ω/ft and a nominal TCR of 0.005% R/C°, ±10%. For 100 feet of heater wire, the total resistance of the sensor wire 26 is nominally 1,000 Ohms at 25° C. This sensor wire will exhibit a 5Ω change in resistance per degree (°C.) change in temperature. Therefore, if the upper boundary of desired wire temperature is 65° C., a change in temperature from 25° C. will result in a nominal change in resistance of 200Ω, or a 20% total resistance change.

An exemplary embodiment of an electro-thermal controller of the present invention suitable for use with an electric blanket will be described in connection with the previously described heater wire. In the preferred embodiment of the electric blanket controller, the operating range of the heater wire is maintained within the range of 25°–65° C. This temperature range is preferably partitioned into nine operating points, which will correspond to nine user selectable heat settings. Table 1 shown below, illustrates nominal wire temperatures and sensor wire resistance for each of the nine temperature settings.

TABLE 1

| Setting (P) | Wire Temp (°C.) | Resistance (Ω) |
| --- | --- | --- |
| 1 | 33 | 1045 |
| 2 | 37 | 1065 |
| 3 | 41 | 1085 |
| 4 | 45 | 1105 |
| 5 | 49 | 1125 |
| 6 | 53 | 1145 |
| 7 | 57 | 1165 |
| 8 | 61 | 1185 |
| 9 | 65 | 1205 |

Figure 10:
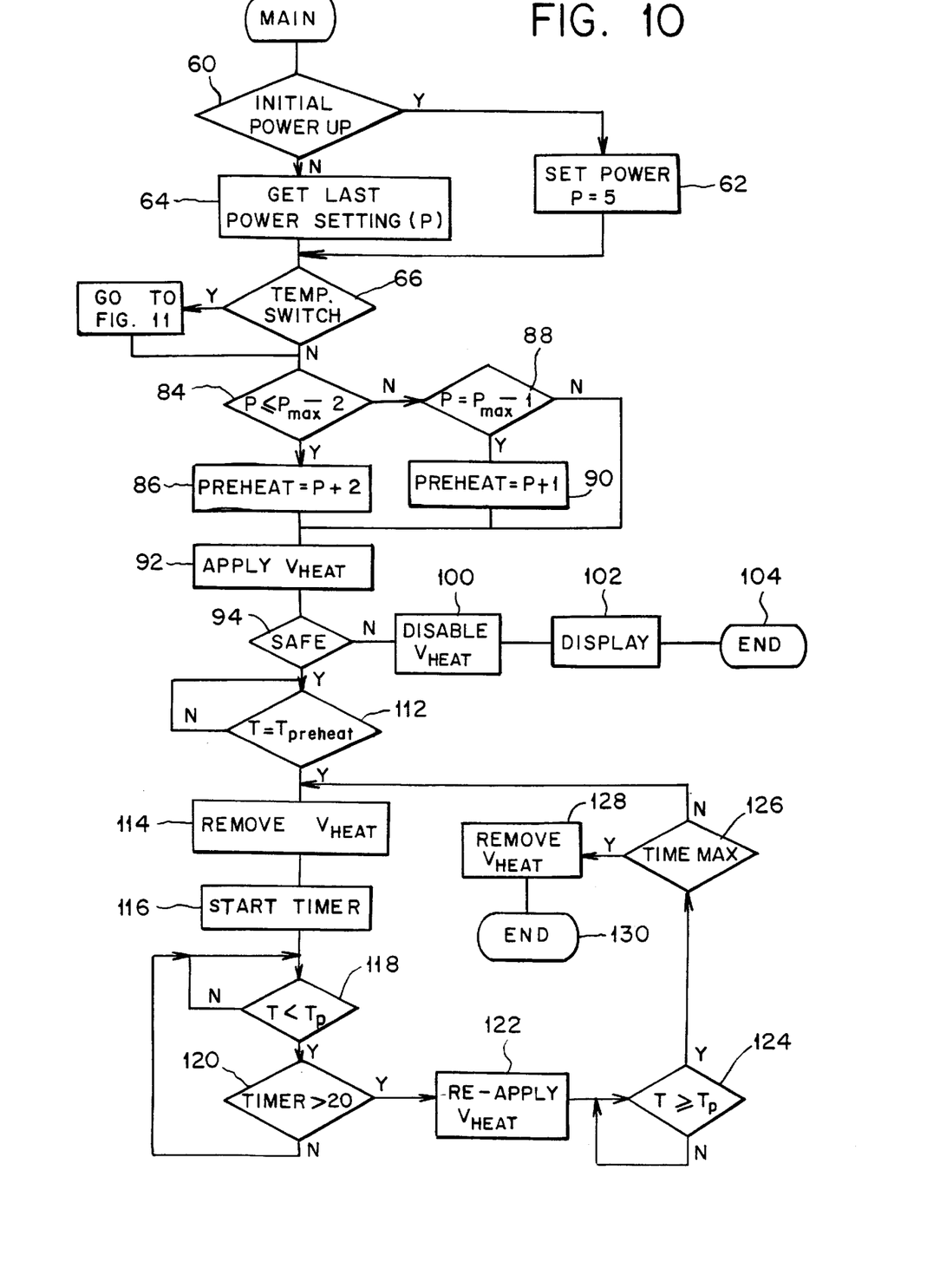
FIG. 10 is a flow chart illustrating a preferred method of operation employed by the electronic control unit formed in accordance with the present invention.

The operation of the electro-thermal controller can best be explained in connection with the exemplary flow chart illustrated in FIG. 10. The ECU 30 preferably includes a programmable digital device, such as a microprocessor 30a. The ECU 30 also preferably includes a first timer circuit 30b and a second timer circuit 30c. When power is applied to the ECU 30 a program is initiated. This program first determines whether power has been applied to the unit previously (block 60). If the ECU 30 detects an initial power-up condition, i.e., power has not been applied previously, the ECU will set a default blanket power setting to the middle of the operating range, such as P=5 (block 62). However, if power to the ECU 30 has been previously applied, the ECU 30 will recall the last power setting selected by the user from a memory location within the ECU 30 (block 64).

After the power setting has been initialized, the ECU 30 checks the status of the user interface to determine if a command to change the power setting has been received (block 66). Referring to FIG. 8, the ECU will be checking the status of switches 42 and 44 as previously described. The switches 42, 44 will be preassigned to increase or decrease the temperature setting. For example, switch 42 can function to increase the temperature while switch 44 functions to decrease the temperature. If activity has been detected on the user interface circuit, the program will be routed to a temperature selection subroutine.

Figure 11:
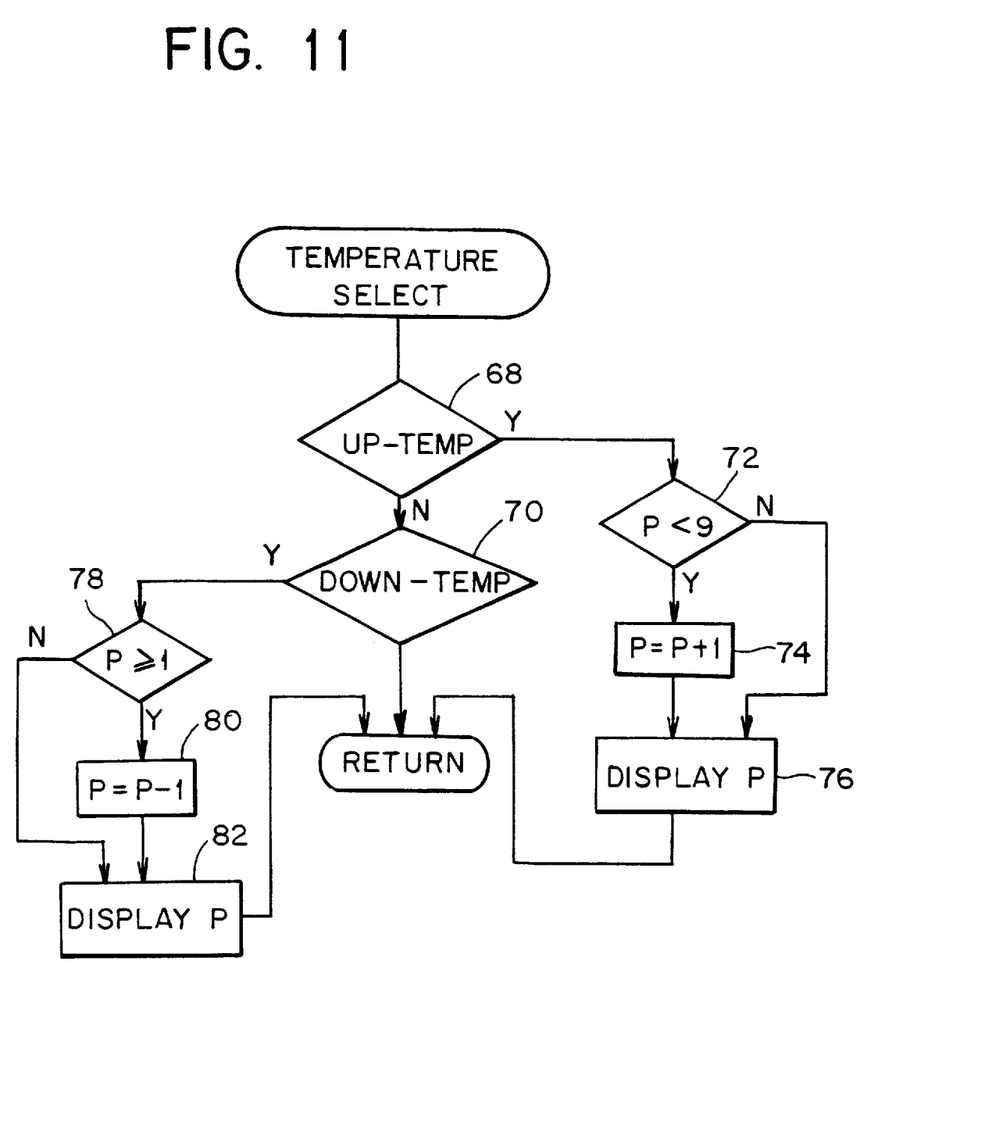
FIG. 11 is a flow chart illustrating the preferred operation of a user interface subroutine used by the electronic control unit of the present invention.

The temperature selection subroutine, which is illustrated in the flow chart of FIG. 11, determines which switch in the user interface has been depressed and alters the power setting in the ECU 30 accordingly. If the ECU 30 detects that the user wishes to increase the operating temperature of the blanket (block 68), the subroutine first checks to determine whether the maximum operating temperature is already set (block 72). If the maximum operating temperature is not set, the subroutine will increment the power setting by 1 (block 74). After incrementing the power setting, the ECU 30 preferably presents a signal to the LCD 46 to display the current power setting (block 76). Once the new power setting is displayed, the subroutine will return to the main flow chart of FIG. 10.

If the temperature selection subroutine determines that the user wishes to decrease the operating temperature of the blanket (block 70), the program will first determine whether or not a minimum power setting has previously been selected (block 78). If the minimum power setting has been previously selected, the power setting will remain unchanged and this setting will be displayed on the LCD 46 by the ECU 30 (block 82). If the minimum power setting has not been selected, the subroutine decrements the power setting by 1 (block 80) and the new power setting will be displayed on the LCD 46 (block 82). At this point, the subroutine will return to the main flow chart of FIG. 10.

In order to pre-heat the blanket, it is desirable for the blanket to operate at a power setting which exceeds that selected by the user during a first heating cycle. However, the electro-thermal controller may not allow the temperature of the heater wire to exceed that of the maximum power setting. Therefore, after servicing the temperature selection routine (FIG. 11), the program within the ECU 30 tests the power setting value to determine whether the power setting can be adjusted during the first heating cycle for pre-heating.

A preferred pre-heat setting is one which is two settings higher than the selected power setting. Therefore, with the nine (9) settings given in this example, if the power setting is less than or equal to seven (7) (block 84), the program can establish a pre-heat value which is equal to the current power setting plus two (2) (block 86). If the power setting is not less than or equal seven (7), the program then tests the power setting to see if the power is equal to eight (8) (block 88). If the program determines that the power setting is equal to eight (8), a pre-heat value equal to nine (9) may be established (block 90). Otherwise, if the power setting is already set to the maximum value of nine (9), no pre-heat value may be established.

After establishing a pre-heat value, the ECU 30 provides a signal to the heater driver circuit 32 to apply a heater voltage to the first conductor 20 (block 92). Preferably, after applying heater voltage to the first conductor 20, the program then routes to a safety check subroutine. The safety check subroutine is illustrated in the flow chart of FIG. 12.

Figures 12, 13:
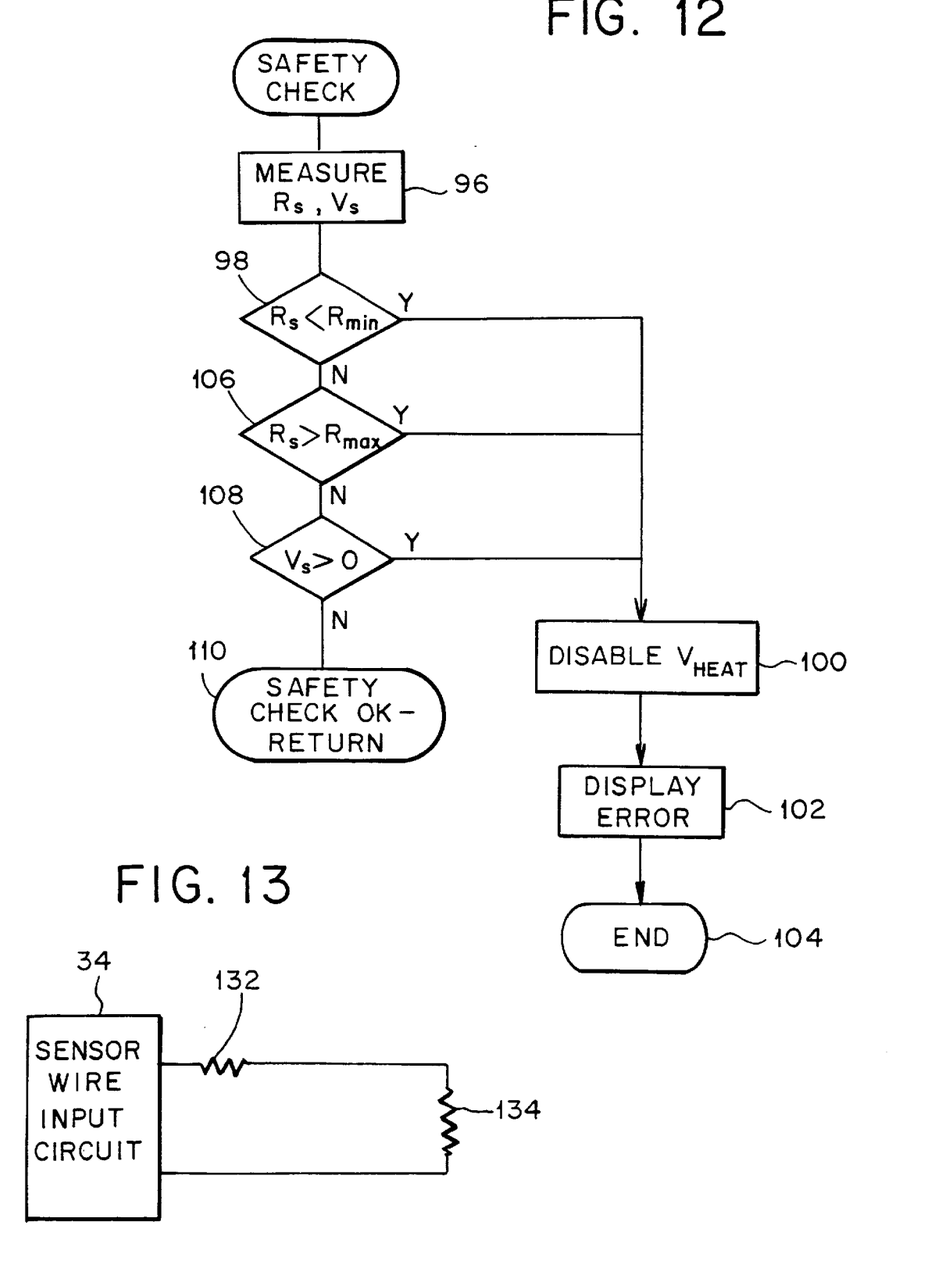
FIG. 12 is a flow chart illustrating the preferred steps of a safety check subroutine performed by the electronic control unit of the present invention.
FIG. 13 is a simplified schematic diagram illustrating the sensor input circuit coupled to a modified sensor wire through a series resistor, thereby applying the improved electro-thermal controller of the present invention to an electric heating pad or throw.

Referring to FIG. 12, the ECU 30 receives a signal from the sensor wire input circuit 34 indicative of an initial resistance and voltage of the sensor wire 26 (block 96). The subroutine then proceeds to check if the resistance of the second conductor 26 is less than a minimum established threshold value (block 98). The minimum value is selected to correspond to a temperature significantly below the expected operating temperature of the blanket, such as 0° C. A resistance value measured below this threshold is indicative of a malfunction in the sensor wire 26 or sensor wire input circuit 34. In this case, the subroutine advances to disable the heater voltage applied to the first conductor 20 (block 100). Preferably, the program within the ECU 30 then displays an error signal on the LCD 46 (block 102). After displaying the error, the subroutine ends the program (block 104).

If the measured resistance of the sensor wire 26 is not less than the minimum threshold value, the subroutine then compares the measured resistance value against a maximum resistance threshold value (block 106). The maximum resistance value is selected to significantly exceed the maximum allowable heater wire temperature. In this example, this temperature threshold is set to approximately 80° C. If the measured resistance exceeds the maximum threshold value, the subroutine disables the heater voltage (block 100) and preferably displays an error code (block 102). The subroutine then ends (block 104) as previously discussed in connection with the resistance being below the minimum threshold value.

If the resistance detected on the second conductor 26 is within a normal operating range, the safety-check subroutine will advance to determine whether a voltage is present on the second conductor 26 (block 108). Under normal operating conditions, no voltage will be present on the second conductor 26. However, if the first insulative material 24 should degrade and break down, the first conductor 20 may come into electrical contact with the second conductor 26. Should this occur, the heater voltage which is present on the first conductor 20 will be coupled to the second conductor 26. This condition is indicative of a potential fire hazard or shock hazard. Should this condition be detected, the subroutine will proceed to disable the heater voltage (block 100) and display an error code (block 102) as previously discussed in connection with the resistance error conditions. If no voltage is detected on the second conductor 26, the safety check subroutine returns control to the main program illustrated in FIG. 10 (block 110).

After the safety check subroutine is complete, the ECU 30 and sensor wire input circuit 34 monitor the resistance of the second conductor 26 to determine if the heater wire has reached the desired temperature established by the pre-heat value (block 112). The ECU 30 performs this test in an iterative loop until the condition becomes true. Once the resistance detected on the sensor wire 26 corresponds to a temperature greater than or equal to the pre-heat temperature, the ECU 30 provides a signal to the heater driver circuit 32 to disable the heater voltage (block 114). The ECU 30 then initializes the first timer 30b (block 116).

After the first timer 30b is initialized, the ECU 30 begins an iterative loop of monitoring the resistance of the sensor wire 26 to determine if the temperature of the heater wire has dropped below that established by the initial power setting selected by the user (block 118). If the measured resistance of the sensor wire 26 indicates that the temperature of the heater wire is below that established for the selected power setting, the program will check the first timer 30b to determine whether a minimum time period has elapsed since heater voltage has been removed (block 120). Preferably, this time period is on the order of 20 seconds. If the minimum time period has not elapsed, the program will return to the iterative temperature test (block 118).

The inclusion of the first timer 30b provides a time domain hysteresis to the heater voltage. This prevents the heater driver circuit 32 from rapidly turning on and off in response to the temperature of the heater wire lingering around a threshold temperature value. Once the temperature is below the power setting threshold and the timer has exceeded the minimum time period, the ECU 30 will provide a signal to the heater driver circuit 32 to reapply heater voltage to the first conductor 20 (block 122).

After reapplying heater voltage, the program in the ECU 30 will then monitor the sensor wire input circuit 34 to determine whether the temperature of the heater wire has met or exceeded that which is expected for the selected power value (block 124). So long as the temperature is below the selected power setting, heater voltage will remain enabled. Once the temperature of the heater wire meets or exceeds the temperature corresponding to the selected power setting, the program will then advance.

The blanket controller of the present invention includes an additional "auto-off" safety feature. This feature is enabled by determining whether a maximum time window, monitored by the second timer 30c, has elapsed since the last activity has been detected on the switches of user interface 36 (block 126). Preferably, the maximum time window will be on the order of 10 hours. If this maximum time window has been exceeded, the program determines that the blanket has been inadvertently left on by the user and removes heater voltage (block 128). If the maximum time window has not been exceeded, the program returns control to block 114. Blocks 114–126 will continue to be performed in a closed loop until the maximum time window has expired, or the unit is turned off by the user.

The present invention is also applicable to a smaller heater appliance, such as a heated throw or heating pad. In these applications, adjustments must be made to compensate for the smaller lengths of heater wire typically used in these applications. Also, the user interface circuit 34 in these applications will typically take a simpler form, similar to that illustrated in FIG. 9.

As an illustrative example, a heating pad with four temperature settings may be formed in accordance with the present invention. Typically, a heating pad will include approximately 20 feet of heater wire as compared to the 100 feet of heater wire used in the blanket example. If the same heater wire used in the blanket is also used for the heating pad, the nominal sensor wire 26 resistance would be 200Ω rather than 1000Ω. However, to facilitate the use of a common ECU 30 and sensor wire input circuit 34, it is preferred to bring the measured resistance of the heating pad wire to a similar range as used for the blanket. This is especially important in high volume manufacturing where it is desirable to use a common application specific integrated circuit (ASIC), which includes the ECU 30 and sensor wire input circuit 34, in all heating appliances.

The resistance of the sensor wire 26 may be increased by forming the sensor wire 26 from a more resistive material and by including more turns per inch in the sensor wire 26. However, it is impractical to increase the resistance by five times in this manner. Therefore, a resistor 132 is preferably interposed between the modified sensor wire 134 and the sensor wire input circuit 34. The resistor 132 is selected such that at the maximum wire temperature, the combined resistance of the modified sensor wire 134 and resistor 132 in the heating pad is substantially equal to that of the sensor wire 26 of the blanket.

In heating pad applications, Underwriters Laboratories (U.L.) allows a maximum wire temperature of 75° C., rather than the 65° C. temperature allowed in blankets. Therefore, the maximum combined resistance should correspond to this higher temperature. Referring to Table 1, a combined resistance at 75° C. of 1225Ω is desired to correspond with the maximum setting (P=9) of the exemplary blanket controller. If the resistance of the modified sensor wire 134 at 75° C. is equal to 580Ω, the resistor 132 is selected to have a resistance of 1225–580Ω, or 645Ω.

Because the resistor 132 has a value which does not vary with changing heating wire temperature, the total resistance change, as a percentage of resistance, is reduced. However, for a heating pad, operation towards the high end of the temperature range is preferred. Therefore, a four temperature setting heating pad can be controlled by selecting blanket settings 5, 7, 8 and 9 to correspond with the four settings of the pad. This will result in operation in accordance with Table 2, shown below.

TABLE 2

| Pad Setting | Blank Power Setting (P) | Wire Temperature °C. | Total Resistance |
|---|---|---|---|
| Lo | 5 | 40 | 1145 |
| Med | 7 | 57 | 1185 |
| Med-High | 8 | 66 | 1205 |
| High | 9 | 75 | 1225 |

Similar adjustments can be made to use a common ECU 30 and sensor wire input circuit 34 to control a heated throw, which will typically include a length of heater wire of approximately 60 feet.

The heater wire of the present invention eliminates the use of carbon-based resistive material as a heating element, and is therefore significantly less flammable than heater wires of the prior art. In addition, the incorporation of a coaxially aligned sensor wire, integral with the heater wire, provides additional safety features. This sensor wire configuration facilitates temperature control of the heater wire and also provides an indication that the insulation protecting the user from the heater wire has failed. When used in combination, the improved electro-thermal controller and heater wire of the present invention provide a safe, controlled heat source, well suited for use in electric blankets, electric throws, electric heating pads and the like.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A heater wire having an integral sensing wire, the heater wire comprising:

a first conductor, the first conductor having a length and a resistance associated with the length, the first conductor being formed as a helical spiral;

a second conductor, the second conductor having a length and a resistance associated with the length, the resistance of the second conductor predictably varying with temperature, the second conductor being formed as a helical spiral in coaxial relationship with the first conductor helical spiral; and a flexible electrical insulator, the flexible electrical insulator being interposed between the first conductor and second conductor such that the first and second conductors are electrically insulated from one another, the flexible electrical insulator further being at least partially thermo-conductive, whereby the second conductor is in thermal communication with the first conductor.

2. A heater wire as defined by claim 1, wherein the first conductor helical spiral is formed having a first spiral direction and the second conductor helical spiral is formed having a second spiral direction, the second spiral direction being opposite from the first spiral direction.

3. A heater wire as defined by claim 2, wherein the first conductor helical spiral is at least partially defined having a first spiral diameter and the second conductor helical spiral is at least partially defined having a second spiral diameter, the second spiral diameter being larger than the first spiral diameter.

4. A heater wire as defined by claim 3, wherein the second conductor is an alloy comprising 99.5% Nickel.

5. A heater wire as defined by claim 4, further comprising a flexible fibrous material, the flexible fibrous material providing a core about which the first conductor helical spiral is wound.

6. An electro-thermal controller for use with a heater wire having an integral sensor wire, the heater wire having a first conductor for heat generation and a second conductor for sensing, each of the first and second conductors having first and second ends associated therewith, the controller comprising:

an electronic control unit;

a heater driver circuit, the heater driver circuit being electrically coupled to the first and second ends of the first conductor and selectively applying a heater voltage thereto in response to a signal received from the electronic control unit;

a sensor wire input circuit, the sensor wire input circuit being electrically coupled to the first and second ends of the second conductor, the sensor wire input circuit measuring a resistance and a voltage associated with the second conductor and presenting a signal to the electronic control unit indicative of the resistance and voltage; and a user interface circuit, the user interface circuit being operatively coupled to the electronic control unit, the user interface circuit providing signals to the electronic control unit in response to a user input, the user interface circuit receiving signals from the electronic control unit and providing a visible display in response thereto.

7. An electro-thermal controller as defined by claim 6, wherein the electronic control unit compares the measured resistance of the second conductor to a minimum threshold value and provides a signal to the heater driver circuit disabling the heater voltage when the measured resistance is less than the minimum threshold value.

8. An electro-thermal controller as defined by claim 7, wherein the minimum threshold value corresponds to a temperature below 25° Celsius.

9. An electro-thermal controller as defined by claim 8, wherein the electronic control unit compares the measured resistance of the second conductor to a maximum threshold value and provides a signal to the heater driver circuit disabling the heater voltage when the measured resistance exceeds the maximum threshold value.

10. An electro-thermal controller as defined by claim 9, wherein the maximum threshold value corresponds to a temperature at least equal to 65° Celsius.

11. An electro-thermal controller as defined by claim 10, wherein the electronic control unit provides a signal to the heater driver circuit disabling the heater voltage in response to the signal from the sensor wire input circuit that a voltage is present on the second conductor.

12. An electric heating appliance comprising:

a heater wire having an integral sensor wire, the heater wire having a first conductor for heat generation and a second conductor for sensing, each of the first and second conductors having first and second ends associated therewith; and an electric controller, the controller comprising:

an electronic control unit;

a heater driver circuit, the heater driver circuit being electrically coupled to the first and second ends of the first conductor and selectively applying a heater voltage thereto in response to a signal received from the electronic control unit;

a sensor wire input circuit, the sensor wire input circuit being electrically coupled to the first and second ends of the second conductor, the sensor wire input circuit measuring a resistance and a voltage associated with the second conductor and presenting a signal to the electronic control unit indicative of the resistance and voltage; and a user interface circuit, the user interface circuit being operatively coupled to the electronic control unit, the user interface circuit providing signals to the electronic control unit in response to a user input, the user interface circuit receiving signals from the electronic control unit and providing a visible display in response thereto for the user.

13. An electric heating appliance as defined by claim 12, wherein the electronic control unit compares the measured resistance of the second conductor to a minimum threshold value and provides a signal to the heater driver circuit disabling the heater voltage when the measured resistance is less than the minimum threshold value.

14. An electric heating appliance as defined by claim 13, wherein the minimum threshold value corresponds to a temperature below 25° Celsius.

15. An electric heating appliance as defined by claim 14, wherein the electronic control unit compares the measured resistance of the second conductor to a maximum threshold value and provides a signal to the heater driver circuit disabling the heater voltage when the measured resistance exceeds the maximum threshold value.

16. An electric heating appliance as defined by claim 15, wherein the maximum threshold value corresponds to a temperature at least equal to 65° Celsius.

17. An electric heating appliance as defined by claim 16, wherein the electronic control unit provides a signal to the heater driver circuit disabling the heater voltage in response to the signal from the sensor wire input circuit that a voltage is present on the second conductor.

\* \* \* \* \*